(12) United States Patent
Lillo et al.

(10) Patent No.: US 7,555,033 B2
(45) Date of Patent: Jun. 30, 2009

(54) BINARY OFFSET CARRIER M-CODE ENVELOPE DETECTOR

(75) Inventors: Walter E. Lillo, Torrance, CA (US); Phllip W. Ward, Garland, TX (US); Anthony S. Abbott, Torrance, CA (US)

(73) Assignee: The Aerospace Corporation, El Segundo, CA (US)

( * ) Notice: Subject to any disclaimer, the term of this patent is extended or adjusted under 35 U.S.C. 154(b) by 490 days.

(21) Appl. No.: 10/874,965

(22) Filed: Jun. 22, 2004

(65) Prior Publication Data
US 2005/0281325 A1  Dec. 22, 2005

(51) Int. Cl.
*H04B 1/00* (2006.01)
(52) U.S. Cl. .......................... 375/150; 375/149
(58) Field of Classification Search .................. 375/140, 375/147–152
See application file for complete search history.

(56) References Cited

U.S. PATENT DOCUMENTS

| | | | | |
|---|---|---|---|---|
| 4,385,401 A | * | 5/1983 | Jagnow et al. | 455/326 |
| 5,488,629 A | * | 1/1996 | Takahashi et al. | 375/150 |
| 5,999,561 A | * | 12/1999 | Naden et al. | 375/142 |
| 6,088,384 A | * | 7/2000 | Hindman | 375/150 |
| 2002/0064216 A1 | * | 5/2002 | Yule et al. | 375/150 |
| 2002/0075077 A1 | * | 6/2002 | Farine et al. | 331/1 A |
| 2003/0231580 A1 | * | 12/2003 | Martin et al. | 370/203 |
| 2004/0071200 A1 | * | 4/2004 | Betz et al. | 375/152 |
| 2005/0270997 A1 | * | 12/2005 | Julien et al. | 370/315 |

* cited by examiner

*Primary Examiner*—Shuwang Liu
*Assistant Examiner*—David Huang
(74) *Attorney, Agent, or Firm*—Derrick Michael Reid

(57) ABSTRACT

An M code envelope detector receives an incoming binary offset carrier (BOC) signal, such as the M code signal, and generates inphase BOC and quadraphase BOC signals, separated by an offset, that have respective ambiguous correlation envelopes, that when combined, provide a near unimodal correlation function with respect to code phase error of the BOC signal having an inherent multimodal autocorrelation function, with the near unimodal correlation envelope being tracked by early and late code replicas at broad one chip phases for providing unambiguous but nonlinear code phase error tracking, which detector is then further improved with the use of code replicas having narrow partial chip phases, such as ⅛ chip phases, for providing near linear code phase error tracking for unambiguous and accurate code tracking of the BOC signal.

19 Claims, 9 Drawing Sheets

M-CODE ENVELOPE DETECTOR

M-CODE ENVELOPE DETECTOR

M-CODE ENVELOPE TRACKER

CARRIER PHASE & FREQUENCY CONTROLLER

COARSE MODE CODE PHASE & FREQUENCY CONTROLLER

COARSE CODE AND CARRIER REPLICA GENERATOR

BROAD AND NARROW M-CODE REPLICA GENERATOR

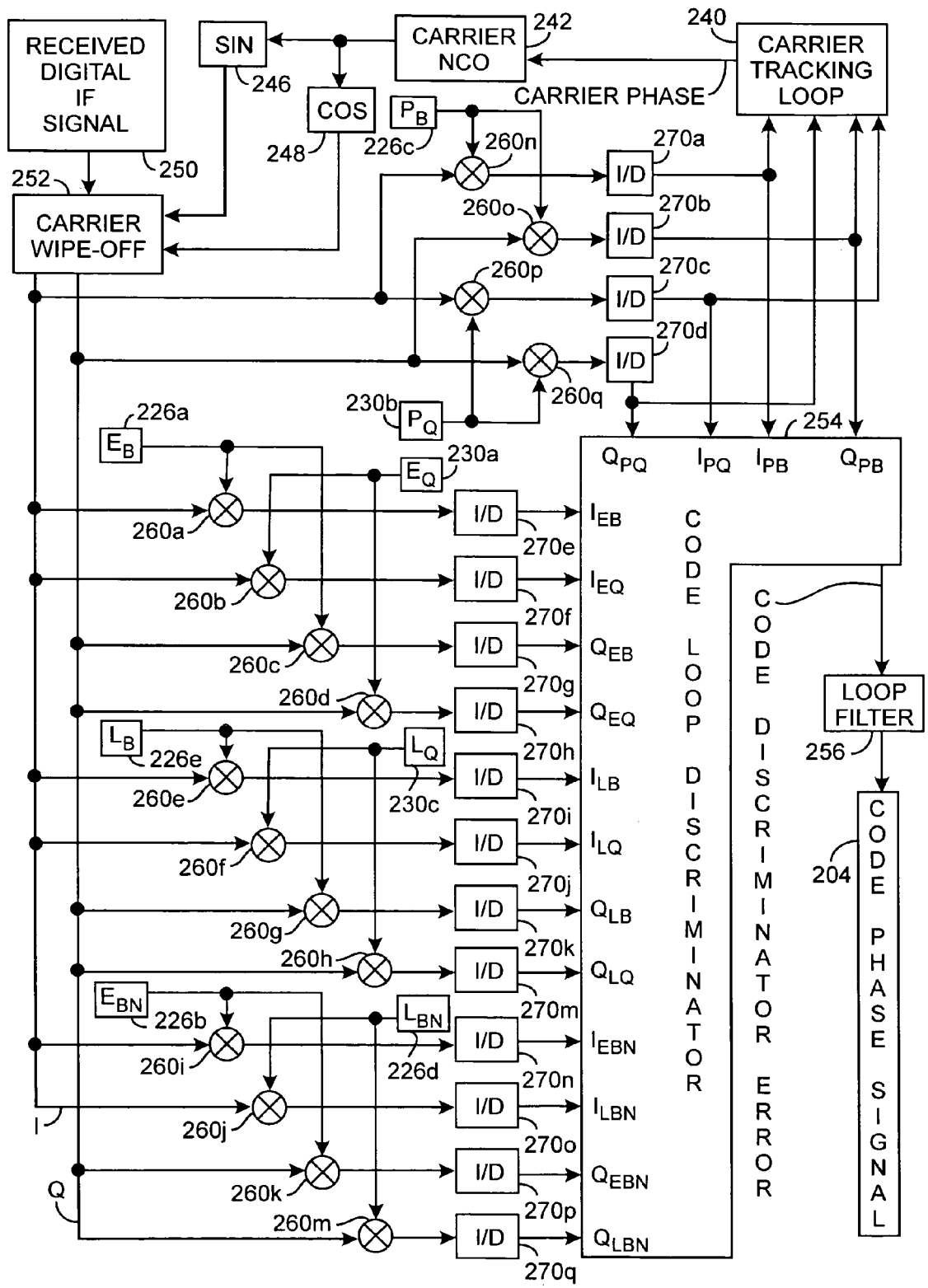
FIG. 3B  BROAD AND NARROW M-CODE PHASE GENERATOR

QBOC (10,5) AND BOC (10,5) CORRELATION ENVELOPES

COMBINED QBOC (10,5) AND BOC (10,5) CORRELATION ENVELOPE

NORMALIZED COMBINED BROAD BOC (10,5) CODE PHASE ERROR

NORMALIZED COMBINED BROAD AND UNCOMBINED NARROW
BOC (10,5) CODE PHASE ERROR

BINARY OFFSET CARRIER M-CODE ENVELOPE DETECTOR

STATEMENT OF GOVERNMENT INTEREST

The invention was made with Government support under contract No. F04701-00-C-0009 by the Department of the Air Force. The Government has certain rights in the invention.

FIELD OF THE INVENTION

The invention relates to the field of spread spectrum communication systems. More particularly, the present invention relates to code phase tracking of spreading codes of received signals, such as an M code signal, having binary offset carrier (BOC) modulation.

BACKGROUND OF THE INVENTION

Spread spectrum signals are used in modern communication and navigation systems. In the transmitter, spread spectrum modulation of the carrier signal spreads a narrowband baseband signal into a broadband spectrum. There are numerous advantages to using spread spectrum signal modulation with the primary advantage being the ability to detect the transmitted spread spectrum signal when the overall signal to noise ratio is significantly below unity, that is, where the noise level is much greater than the signal level. In the receiver, a replica of the same spread spectrum modulation is used to correlate with the received spread spectrum signal that results in despreading and subsequent detection of the transmitted signal. If there was a digital data message transmitted along with the spread spectrum signal, this narrowband baseband data signal remains on the carrier after despreading the spread spectrum signal. Typically, the digital data is detected by phase locking to the carrier signal, then detecting the digital data transitions when phase reversals of the carrier signal take place.

Spread spectrum signals that are generated by pseudo random noise (PRN) code generators are called non-return to zero (NRZ) signals. Even though the theoretical bandwidth of the spread signal is infinite, most of the signal energy is within the double-sided bandwidth contained between the null frequencies located symmetrically on both sides of the carrier frequency. These nulls occur at the chipping frequency of the NRZ PRN chipping rate that is the clock frequency of the code generator. For example, in the Global Positioning System (GPS) satellite navigation system, the NRZ PRN chipping rate of the military NRZ precision encrypted code or P(Y) code is 10.23 million chips per second (Mcps). Therefore, the two-sided bandwidth to the first nulls is 20.46 MHz. The chipping rate of the coarse/acquisition (C/A) code is 1.023 Mcps. Therefore, the two-sided bandwidth to the first nulls is 2.046 MHz. The peak power of the NRZ spread spectrum is located near the center frequency, that is, near the zero offset from the carrier frequency. Most of the energy of the C/A code is within the first null. The same is true for the P(Y) code.

However, there is another class of spread spectrum signals that require the peak power distribution to be off-center, that is, not near the carrier frequency. This off-center split spectrum utilizes the available power in the outer bands of the allocated spectrum bandwidth. Even though the spread spectrum signal minimizes correlation between signals at similar power levels occupying the same bandwidths, the split spectrum permits much larger signal powers in one bandwidth sector from interfering with lower signal powers in another sector of the same allocated bandwidth. To create power spectra in off-center portions of the bandwidth, a binary signal is multiplied with the NRZ signal along with the data signal and the result modulates the carrier signal. This spread spectrum signal modulation technique is called binary offset carrier (BOC) modulation. The resulting spread spectrum energy distribution of signal power symmetrically around the carrier frequency depends on the ratio between the binary signal and the chipping rate of the NRZ code generator. For example, in GPS, a new split spectrum has been introduced for use by the military called the M code. Because the lowest GPS chipping rate signal is the coarse/acquisition code or C/A code at 1.023 Mcps, the BOC notation adopted for GPS is based on integer multiples of the C/A code chipping rate. For GPS, the symbolic notation is BOC(M,N), where M is the binary signal multiple and N is the NRZ signal multiple. For the M code, the integer notation is BOC(10,5). Thus, the binary signal is 10.23 MHz and the NRZ code generator clock is 5.115 MHz. The spread spectrum that results from the M code BOC(10,5) modulation is well known. The peak power is split into two bands centered at plus and minus the binary signal frequency, that is, plus and minus 10.23 MHz from the carrier frequency. Because the chipping rate for M code is 5.115 MHz, the bandwidth of both sides of the split spectrum is 10.23 MHz.

Traditional code division multiple access (CDMA) spread spectrum systems code-tracking loops are usually based on steepest ascent algorithms. The code-tracking loop is used to align the replica code with the incoming code of the received signal. The steepest ascent algorithms work for traditional CDMA spread spectrum signals because the code autocorrelation signals are unimodal. That is, the unimodal autocorrelation function has a single peak that is tracked using the steepest ascent algorithm. As is well known, the correlation envelope of current GPS spread spectrum signals, such as C/A-code and P(Y)-code is approximately a triangle having rounded peak amplitude that corresponds to perfect correlation of the GPS receiver replica code with the received code. The extremities of the base of this envelope triangle have approximately zero amplitudes that correspond to a plus or minus 1-chip offset of the replica code with respect to the incoming code where the replica code becomes effectively uncorrelated with the received code. The modernized military M code signal is a BOC(10,5) spread spectrum signal. The Galileo navigation satellite system also plans to use BOC spread spectrum signals. The M code autocorrelation is a multimodal function of code phase error and makes demodulation and tracking difficult. For BOC signals, of which M code is a particular instance, the code autocorrelation function is multimodal. Using steepest ascent algorithms with a BOC signal would result in ambiguity because it could be tracking the wrong peak of the BOC code correlation function.

The problem occurring in a BOC signal receiver during the detection process of a BOC signal is that the correlation envelope does not result in a single or unimodal correlation peak as is the case with the NRZ signal. As a result, multiple, that is, multimodal, stable code-tracking states occur for the BOC signal. However, only the central correlation peak is the correct one. In other words, the BOC code tracking loop can be ambiguous when the code phase tracking loop locks onto an off-center peak of the multimodal correlation function. Hence, BOC code phase tracking is subject to errors when the code phase tracking locks onto an incorrect code phase when tracking an off-center peak of the correlation function.

The correlation envelope for a typical BOC signal, in this case BOC(10,5) or M code has seven correlation peaks, the center one of which is the correct correlation peak with the remaining peaks decreasing in amplitude in equal amounts from both sides of the center peak. For example, consider the output of an early minus late (E–L) code discriminator in the code-tracking loop with the nearly optimal ⅛-chip E–L correlator spacing for BOC(10,5). This E–L discriminator would output seven positive slope zero crossings corresponding to these seven correlation peaks if the replica code were shifted plus and minus one M code chip with respect to perfect alignment with the incoming M code (zero error input). Only the central discriminator output is the true one, with a tracking range of plus and minus one-sixteenth (0.0625) chip. The remaining six are also stable tracking regions of plus and minus 0.0625 chip, but are offset with respect to the true code tracking position. This ambiguity problem is caused by the multimodal BOC signal producing multiple zero crossings along the input error axis of the code loop discriminator.

The normal correlation envelope for the M code signal is a set of tapered triangles with both positive and negative peaks. Only the central positive peak corresponds to perfect correlation of the GPS receiver replica M code with the received code. The BOC signals in space provide numerous benefits, but the BOC signals create code tracking problems during signal acquisition and code tracking due to the multimodal peaks of the autocorrelation function of the BOC signal. Each of the multiple correlation peaks corresponds to signal detection during the acquisition process and to a stable code loop state during the tracking process. However, only the central peak is the correct state. In other words, the result of correlation with the BOC spread spectrum signals is ambiguous when based on tracking a peak because the BOC correlation function results in multiple peaks, the center one of which is the correct peak for use during signal acquisition and tracking. Hence, there are problems associated with the tracking of only the correct center peak of the M code correlation function because of the presence of multiple peaks of the multimodal autocorrelation function.

One method to track the ambiguous offset carrier signal is called the bump-jumping algorithm that does not continuously resolve the ambiguity problem. The bump-jumping algorithm requires the use of a very early and very late correlator. The very early correlator is typically placed one-quarter chip early with respect to the punctual or prompt correlator. The very late correlator is placed late by the same amount. The decision to "bump" is made whenever the very early correlation or the very late correlation appears to be greater than the prompt correlation. This would be the case if the prompt correlator slipped into a false correlation region. This has the disadvantage of requiring the tracking loop to actually slip into a false tracking state before this technique can decide to jump over to the next peak in a search for the correct center peak. In other words, the bump-jumping algorithm does not continuously track and correct the code loop error after that error exceeds the narrow central true tracking region. Another approach involves combining the ambiguous code discriminator output of a conventional M code delay lock loop with the output of an unambiguous code discriminator. The unambiguous discriminator is generated from the combination of the two M code sidebands each down-converted to the carrier (center) frequency. The upper sideband is converted to an NRZ code by down-converting it to the center frequency. This is accomplished by multiplying the incoming signal with a −10.23 MHz signal. Likewise, the lower sideband is up-converted by multiplying with a +10.23 MHz signal. Each NRZ signal is separately filtered, then correlated with wide (1-chip) early and late correlators derived from the replica NRZ code generator. The envelopes of the two early components are combined and the two late component envelopes are combined, then processed through an E–L discriminator. However, this implementation is complicated. These and other disadvantages are solved or reduced using the invention.

SUMMARY OF THE INVENTION

An object of the invention is to provide an envelope detector of a binary offset carrier signal.

Another object of the invention is to provide an envelope detector of an M code binary offset carrier (BOC) signal.

Another object of the invention is to provide an M code envelope detector for unambiguous detection of the correct code phase of a received BOC signals.

Yet another object of the invention is to provide a correlation envelope detector for generating code despread and carrier demodulated received centered and offset BOC signals, offset from each other and having respective correlation functions for unambiguous code phase tracking.

A further object of the invention is to provide a correlation envelope detector for generating code despread and carrier demodulated received inphase centered and quadraphase offset BOC signals, offset from each other and having respective correlation functions that when combined provide a near unimodal correlation function for unambiguous code phase tracking.

A further object of the invention is to provide a correlation envelope detector for generating code despread and carrier demodulated received centered and offset BOC signals, offset from each other and having respective correlation functions that when combined provide a near unimodal correlation function for unambiguous code phase tracking.

Yet a further object of the invention is to provide a correlation envelope detector for generating code despread and carrier demodulated received centered and offset BOC signals, offset from each other and having respective correlation functions that when combined provide a near unimodal correlation function tracked by broad and narrow chip phase code replicas for providing a linear code phase tracking function for unambiguous code phase tracking of the received BOC signal.

The invention is directed to an envelope detector for detecting the autocorrelation envelope of a BOC signal, such as the M code signal, for preferred use in a spread spectrum communication system for improved unambiguous coherent code phase tracking. A near unimodal code autocorrelation function is generated from the BOC signal having an inherent multimodal autocorrelation function characterized as having multiple peaks with an ambiguous code phase offset. The near unimodal M code autocorrelation function can be unambiguously tracked in a narrow pull-in region of code phase error offsets between the incoming code and the replica code during code phase tracking. In a first embodiment, the received BOC signal is firstly code despread with one set of replica codes, quadraphase split, and then carrier demodulated. In a second embodiment, the received BOC signal is firstly carrier demodulated, quadraphase split, and then despread using two sets of inphase and quadraphase replica codes. These two different processes are equivalent, as both serve to demodulate, despread and quadraphase split the received BOC signal.

The envelope detector generates two sets of quadrature demodulated signals, including I and Q inphase BOC signals and I and Q quadraphase BOC (QBOC) signals from the received signal. The inphase and quadraphase BOC and QBOC signals are separated by a phase offset that is preferably a $\pi/2$ (90 degree) offset. When the squares of the two sets of BOC and QBOC signals are combined, a near unimodal correlation function is generated with respect to code phase error of a received BOC signal that otherwise has an inherent multimodal autocorrelation function with inherent ambiguous code phase tracking. The near unimodal correlation function is characterized as having a single major center peak at correct code phase between the incoming code of the BOC signal and a prompt code replica. The near unimodal autocorrelation function can be broadly tracked by early and prompt code replicas at one chip phase separation for providing unambiguous but nonlinear code phase error tracking function. The code phase tracking is unambiguous near the correct code phase for improved code phase tracking.

In a further improvement, narrow code replicas are generated and have narrow partial chip phases, that along with broad code replicas, provide a near linear unambiguous code phase tracking function for unambiguous and accurate tracking of the BOC signal, with accurate code phase tracking across the tracking code phase pull-in region centered about the correct code phase. The narrow code replicas are used for generating narrow correlation envelopes of only the inphase BOC signal. The ambiguous narrow correlation envelopes are added to the broad combined correlation envelops for providing composite correlation envelopes comprising combined broad correlation envelops and narrow uncombined correlation envelopes. The early and late composite correlation envelopes are used for generating the code phase error that is linear respecting an input error being the early and late composite correlation envelopes. The linear code phase error function can be used for improved code phase tracking in a code-tracking loop. As such, unambiguous and ambiguous correlation envelopes are combined for improved code phase tracking. The detector can be used for improved acquisition of the incoming spreading code in the presence of Doppler uncertainty. The envelope detector can be used, for examples, in GPS or Galileo tracking loops or communication systems communicating BOC signals. These and other advantages will become more apparent from the following detailed description of the preferred embodiment.

BRIEF DESCRIPTION OF THE DRAWINGS

FIG. 3B is a block diagram of a broad and narrow M code phase generator.

DETAILED DESCRIPTION OF THE PREFERRED EMBODIMENT

Figure 1:
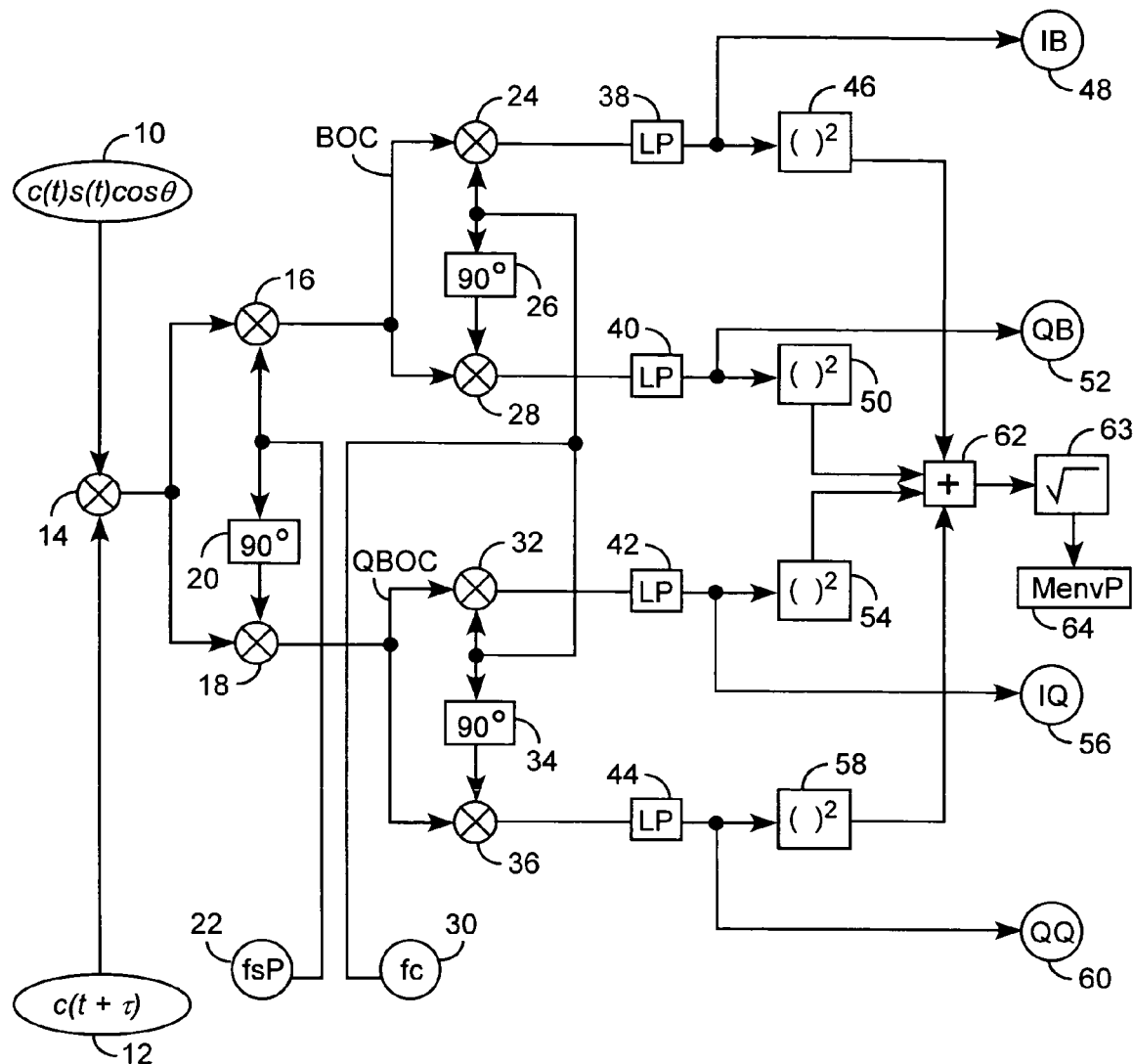
FIG. 1 is a block diagram of an M code envelope detector having a front-end despreader.

An embodiment of the invention is described with reference to the figures using reference designations as shown in the figures. Referring to FIG. 1, a c(t)s(t)cosθ IF signal 10 is received and despread by a prompt c(t+τ) PRN code signal 12 by multiplication using mixer 14 for producing a despread received signal. The despread received signal is then fed into two branches including a BOC branch and a QBOC branch. The despread signal on the BOC branch is multiplied by a prompt square wave clock fsP signal 22 by mixer 16 producing a BOC signal. The fsP signal 22 is phase shifted by a ninety-degree phase shifter 20 that can be, for example, a shift register for providing a phase shifted fsP signal communicated to a mixer 18. The despread signal in the QBOC branch is multiplied by the phase shifted signal from the phase shifter 20 by mixer 18 for producing a QBOC signal. The BOC signal is then demodulated in quadrature by the carrier signal fc using mixer 24 and mixer 28 using a ninety-degree phase shifter 26 for respectively providing I and Q demodulated BOC signals. The QBOC signal is also concurrently demodulated in quadrature by the carrier signal fc using mixer 32 and mixer 36 with a ninety-degree phase shifter 34 for respectively providing I and Q demodulated QBOC signals. The demodulated I and Q BOC signals are respectively filtered by filters 38 and 40 for providing an in phase BOC signal IB 48 and a quadrature BOC signal QB 52 respectively communicated to squarer 46 and 50 for providing a squared in phase BOC signal IB and a squared quadrature BOC signal QB. The demodulated I and Q QBOC signals are respectively filtered by filters 42 and 44 for providing an in phase QBOC IQ signal 56 and a quadrature QBOC signal 60 respectively communicated to squarers 54 and 58 for providing a squared in phase QBOC signal and a squared quadrature QBOC signal. The squared IB, QB, IQ, and QQ signals are summed by a summer 62 for providing a sum signal being the sum of the squares of the IB, QB, IQ, and QQ signals, which sum signal is fed into a square rooter 63 for providing a prompt MenvP M code envelope signal 64 that is equal to the square root of the sum of the squares of the IB, QB, IQ, and QQ signals 48, 52, 56, and 60, respectively. The prompt MevnP M code envelope signal is an envelope detection output signal.

Figure 2A:
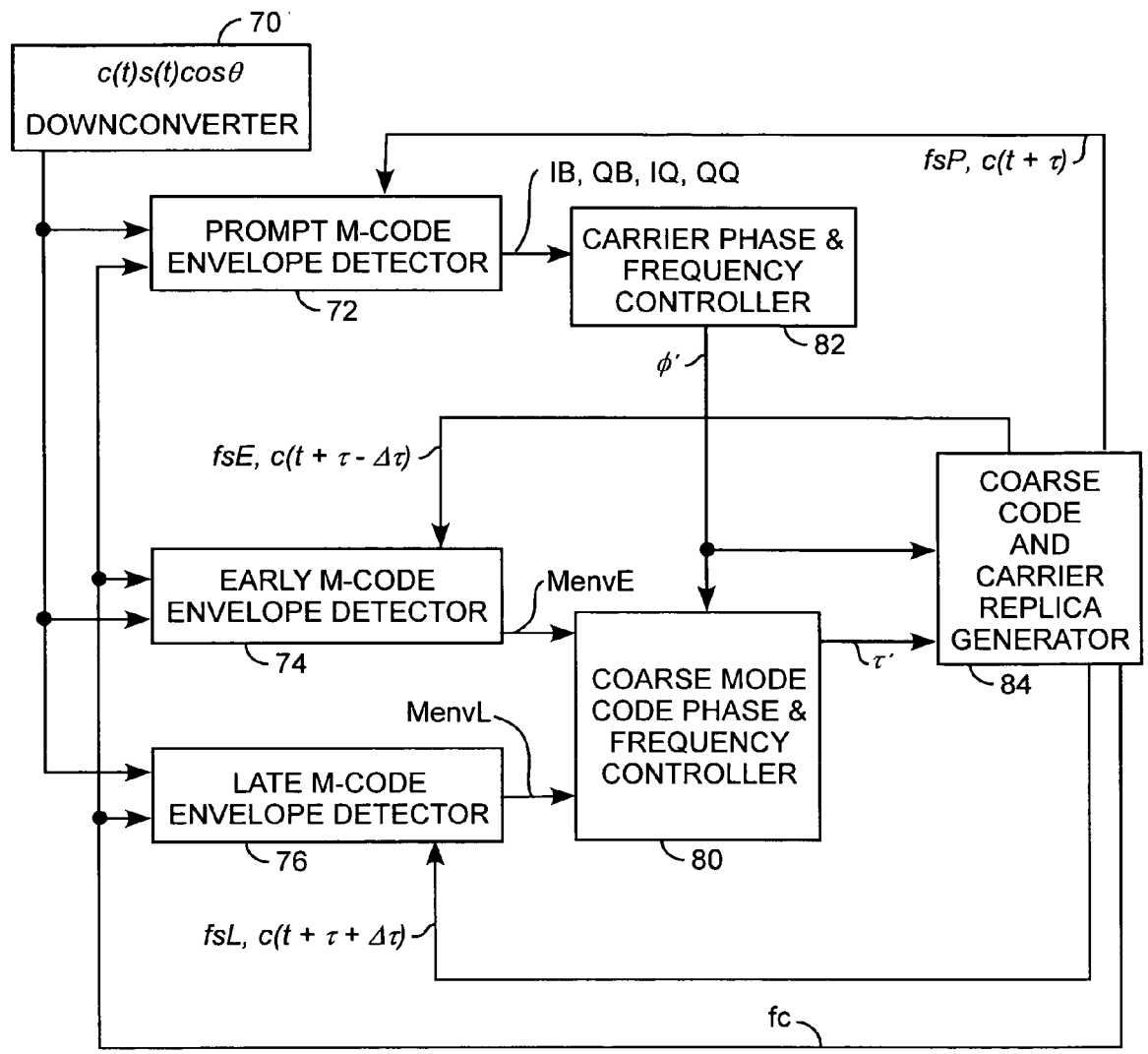
FIG. 2A is a block diagram of an M code envelope tracker.

Referring to FIG. 2A, the M code envelope detector is used in a coherent receiver that provides code phase tracking of the M code envelope. A front end down converter 70 provides the IF received signal 70 that is down converted from a received RF signal. The received signal IF signal 70 is fed into a prompt M code envelope detector 72, an early M code envelope detector 74 and a late M code envelope detector 76 for respectively providing an early M code envelope signal MenvE and a late M code envelope signal MenvL. The detectors 72, 74, and 76 would also generate IB and QB BOC signals, and IQ, and QQ QBOC signals. The IB, QB, IQ, and QQ signals from the prompt detector 72 are fed into a carrier phase and frequency controller 82 for generating an estimated carrier frequency error signal $\phi'$ that is a time derivative of a carrier phase error signal $\phi$. The early and late envelope detection signals MenvE and MenvL from the detectors 74 and 76, as well as the estimated carrier frequency error signal $\theta'$ are fed into a coarse mode code phase and frequency controller 80 for generating a code error rate signal $\tau'$ that is a time derivative of a code phase error $\tau$.

The estimated carrier frequency error signal φ' and the code error rate signal τ' are derivatives of the estimated carrier phase error φ and the estimated code phase error τ, respectively. The carrier frequency error φ' and the code error rate τ' signals are fed into a coarse code and carrier replica generator 84 that generates the prompt square wave signal fsP 22 and prompt code replica signal c(t+τ) 12 that is fed into the prompt envelope detector 72, generates an early square wave signal fsE and early code replica signal c(t+τ−Δτ) that are fed into the early envelope detector 74, and generates a late square wave signal fsL and late code replica signal c(t+τ+Δτ) that are fed into the late envelope detector 76. As such, the M code envelope tracker coherently operates in a closed loop. The MenvE and MenvL signals and the estimated carrier frequency error signal φ' are fed into the coarse mode code phase and frequency controller 80 that adjusts the estimated code phase error τ using the estimated carrier frequency error signal φ' and the difference in value between MenvE and MenvL envelopes. The estimated code error rate signal τ' and the estimated carrier frequency error signal φ' are inputs to the coarse mode code and carrier replica generator 84 to produce the fsP, fsE, and fsL square waves, the prompt code replica, the early code replica, and the late code replica.

Figure 2B:
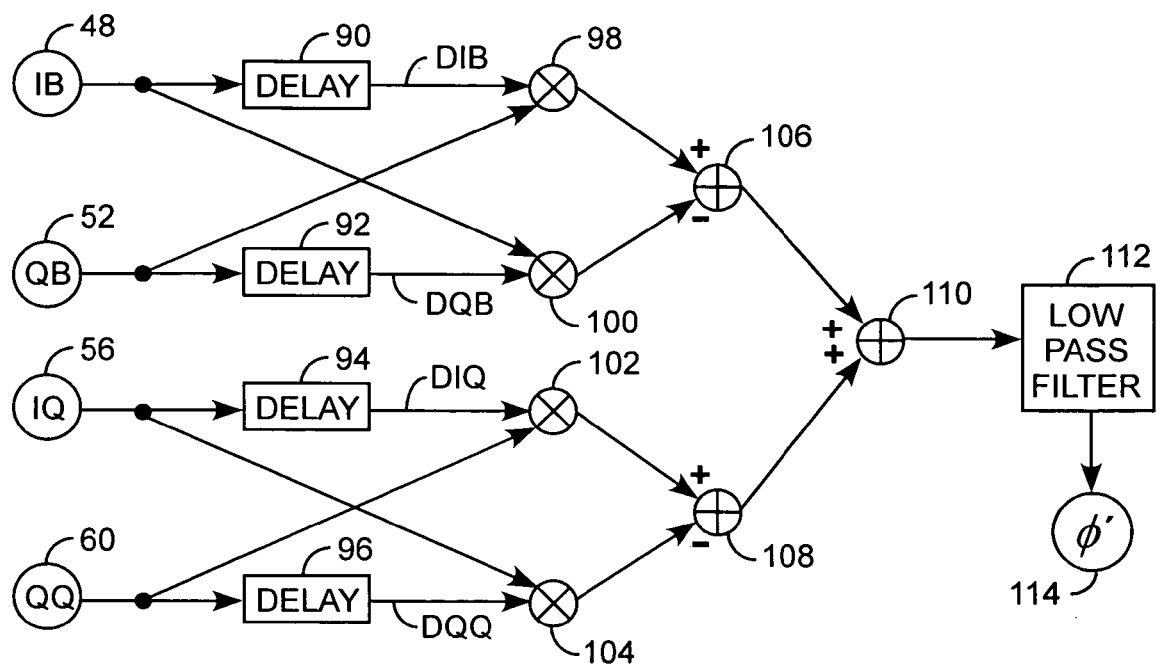
FIG. 2B is a block diagram of a carrier phase and frequency controller.

Referring to FIG. 1, 2A, and 2B, and more particularly to FIG. 2B, the carrier phase and frequency controller 82 includes four delays 90, 92, 94, and 96 for respectively delaying IB 48 for producing a delayed DIA signal, while QB 52 is delayed by the delay 92 for producing the a delayed DIB signal, while IQ 56 is delayed by the delay 94 for producing a delayed DIQ signal, and while QQ 60 is delayed by the delay 96 for producing a delayed DQQ signal. The QB and DIA signals are multiplied at mixer 98 to produce a QB×DIA signal. The IB and DQB signals are multiplied by mixer 100 to produce an IB×DQB signal. The QQ and DIQ signals are multiplied by mixer 102 to produce a QQ×DIQ signal. The IQ and DQQ signals are multiplied by mixer 104 to produce an IQ×DQQ signal. The product IB×DQB signal is subtracted from the product QB×DIB signal by subtractor 106 for providing a QB×DIB−IB×DQB difference signal. The product IB×DQQ signal is subtracted from the product QB×DIB signal by subtractor 108 for providing a QB×DIB−IQ×DQQ difference signal. The QB×DIB−IB×DQB difference and QB×DIB−IQ×DQQ difference are summed by a summer 110 producing a [QB×DIB−IB×DQB]+[QB×DIB−IQ×DQQ] sum signal as a carrier phase sum signal that is filtered by a low pass filter 112 for providing the estimated carrier frequency error signal φ'.

Figure 2C:
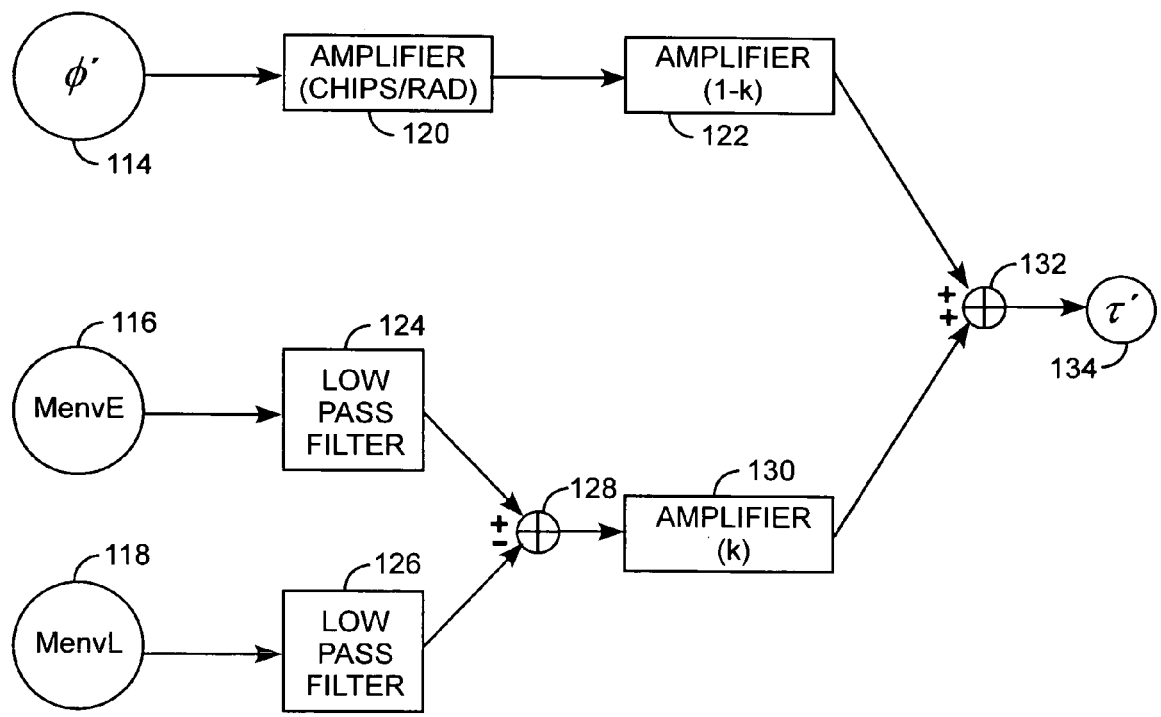
FIG. 2C is a block diagram of coarse mode code phase and frequency controller.

Referring to FIGS. 1, 2A, 2B, and 2C, and more particularly to FIG. 2C, the coarse mode code phase and frequency controller 80 generates the estimated code error rate τ'. The estimated carrier frequency error signal φ' 114 is amplified by a conversion amplifier 120 to produce a first nominal code phase error signal. The gain of conversion amplifier 120 is equal to the ratio of the number of PRN code chips per second divided by the number of radians per second. The first nominal code phase error signal from the conversion amplifier 120 is scaled by a 1−k amplifier 122 for providing a first scaled code phase error signal. Concurrently, the MenvE envelope signal 116 is filtered by low pass filter 124 to produce a filtered MenvE signal. The MenvL envelope signal 118 is filtered by low pass filter 126 to produce a filtered MenvL signal. The filtered MenvL signal is subtracted from the filtered MenvE signal by a subtractor 118 to produce a second nominal code phase error rate signal. The second nominal code error rate signal is scaled by a k amplifier 130 to produce a second scaled code phase error rate signal. The first and second scaled code phase error rate signals are added by summer 132 to produce the estimated code error rate signal τ' 134. When the MenvE and MenvL envelop signals are normalized to have unity peak amplitudes, the 1−k amplifier 122 and the k amplifier 130 will have gains that sum to unity, where [k+(1−k)=1.

Figure 2D:
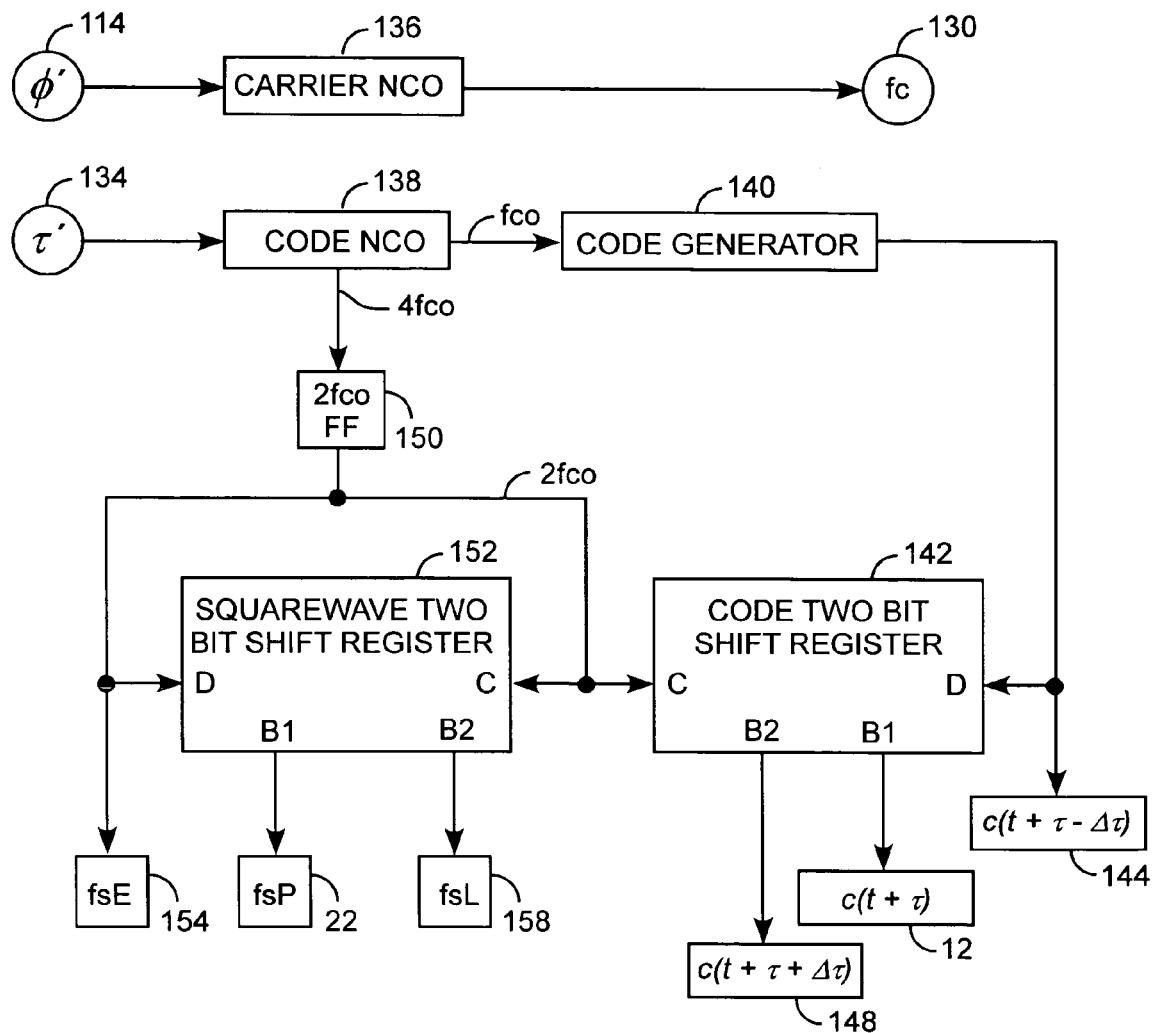
FIG. 2D is a block diagram of a coarse code and carrier replica generator.

Referring to FIGS. 1, 2A, 2B, 2C, and 2D, and more particularly to FIG. 2D, the estimated carrier frequency error signal φ' 114 is fed into a carrier NCO 136 that adjusts the frequency of the carrier frequency signal fc 130. Concurrently, the code error rate signal τ' 134 is fed into a code NCO 138 that provides fco and 4fco clock signals. The fco signal is fed into a code generator 140 that outputs the replica NRZ M code at the fco clock-chipping rate. The code generator 140 generates an early code replica c(t+τ−Δτ) 144 that is fed into a two-bit shift register 142 for generating the prompt code replica c(t+τ) 12, and for generating the late code replica c(t+τ+Δτ) 148. The 4fco clock signal is fed into a 2fco flip flop 150 that divides the 4fco signal by two and generates a square wave signal 2fco. The 2fco signal is the early square wave signal fsE 154. The 2fco early clock signal 154 clocks the code two-bit shift register 142 and clocks the square wave two-bit shift register 152. The square wave two bit shift register 152 generates the prompt clock signal fsP 22 and generates a late square wave signal fsL 158. While shown as digital square wave signals with one bit precision, the fsP, fsL, and fsE could be digital sinusoidal signals with multi bit precision. In the exemplar form, the square wave signals fsP, fsL, and fsE are one bit sine signals, where fsE=sin(ω(t+τ−Δτ)), fsL=sin(ω(t+τ+Δτ)), and fsP=sin(ω(t+τ)) with ω being the frequency of twice the chipping rate. The estimated code phase error τ is equal to $\tau_o + \tau' \Delta t$ where $\tau_o$ is the code phase error at an end of the previous chip period having duration of Δt. As such, the closed loop operation of the M code envelope tracking serves to adjust the local carrier fc and the fsP, fsE, fsL, square waves, the early, the late, and the prompt code replicas, and the estimated carrier frequency error signal φ' to maintain coherent despreading and demodulation of the received signal 70.

The incoming signal which for a particular satellite can be viewed as c(t)s(t)cosθ plus noise where c(t) is the chipping code and s(t) is a modulating square wave, the binary offset carrier. The replica of the code is shifted by an unknown amount with respect to the incoming code signal c(t+τ). The phase and frequency of the replica code corresponds to the estimate of the position and velocity of the receiver antenna phase center with respect to the satellite transmitter antenna phase center. The line of sight velocity between the satellite and the receiver antenna phase centers causes a Doppler shift, so the replica code must be corrected according to the estimate of the code Doppler in the incoming code c(t+τ) signal. A sine wave fs whose frequency is the same as that of the square-wave, s(t), is also corrected according to the estimate of the Doppler effect on the incoming s(t). A sine wave fc whose frequency is that of the carrier is also corrected according to the estimate of the Doppler effect on the incoming carrier frequency.

For the tracking region where two PRN codes are within a chip, the autocorrelation of a PRN is unimodal with a peak value at the point where the codes are perfectly aligned, the square of the correlation is also unimodal and positive with a single peak at the point where the codes are aligned provided the two codes are within slightly less than one chip from each other. Outside of this region, the PRN code correlation is approximately zero. Traditional PRN code tracking algorithms look to drive the code replica to a position where a term proportional to either the code autocorrelation, or the corresponding squares of the code autocorrelation is locally maximized. Because the PRN code autocorrelation function and the squared version are unimodal over the code phase errors, and the peak value of autocorrelation corresponds to perfect alignment of the codes, PRN code tracking can be accomplished using conventional PRN code tracking algorithms.

The code for the M code, z(t), can be expressed as z(t)=c(t)s(t) where c(t) is an NRZ PRN code with a chipping rate of 5.115 M Chips and s(t) is a square wave with a frequency of 10.23 MHz. Because M code is the product of a PRN code and a square wave, the autocorrelation function of the M code is no longer unimodal when the codes are within a chip of each other, but has several peaks and valleys. The highest peak of the autocorrelation function corresponds to the place where the codes are perfectly aligned but there are other local decreasing peaks. The square of the autocorrelation function has even more local peaks in the area of code phase alignment. Therefore, traditional code tracking algorithms which drive the code replica to a local maxima of a term proportional to either the code autocorrelation or corresponding square version will only guarantee convergence to the correct solution when the code phase error is sufficiently small between the replica code and the incoming code. The autocorrelation of the NRZ PRN code can be expressed by the term $E(c(t)c(t+\tau))$. The term $E(c(t) c(t+\tau))$ expresses an ideal M code envelope. Determining the value of $E(c(t) c(t+\tau))$ enables resolving ambiguities in tracking the M code signal, and allows for a larger number of chips as an increased pull-in region. The ability to determine the NRZ M code envelope is useful during signal acquisition. The ideal envelope function is unimodal and does not oscillate between positive and negative values so as to allow for detectable correlation in the presence of decreased accuracy in the estimate of the code phase and code frequency. After using the envelope detector to determine a rough estimate of the code phase error, the estimate is refined by tracking the sharp peaks resulting from the autocorrelation of the M code signal.

The envelope detection function is an approximation of the ideal envelope detection function that possesses the same benefits. To obtain the envelope function at a given point, the replica code is correlated with the incoming signal with the following two signal codes $c(t+\tau) \sin(\omega(t+\tau))$ and $c(t+\tau) \cos(\omega(t+\tau))$. The terms $\sin(\omega(t+\tau))$ and $\cos(\omega(t+\tau))$ are not to be confused with the carrier replicas, which are $\sin(2\pi f_c t)$ and $\cos(2\pi f_c t)$. Thus, the incoming signal is correlated against the replicas $c(t+\tau)\sin(\omega(t+\tau))\cos(2\pi f_c t)$, $c(t+\tau)\sin(\omega(t+\tau))\sin(2\pi f_c t)$, $c(t+\tau)\cos(\omega(t+\tau))\cos(2\pi f_c t)$, and $c(t+\tau)\cos(\omega(t+\tau))\sin(2\pi f_c t)$. The result of the correlation processes are IB=LP$[c(t)s(t)\cos \theta c(t+\tau)\sin(\omega(t+\tau))\cos(2\pi f_c t)]$, QB=LP$[c(t)s(t)\cos \theta c(t+\tau)\sin(\omega(t+\tau))\sin(2\pi f_c t)]$, IQ=LP$[c(t)s(t)\cos \theta c(t+\tau)\cos(\omega(t+\tau))\cos(2\pi f_c t)]$, QQ=LP$[c(t)s(t)\cos \theta c(t+\tau)\cos(\omega(t+\tau))\sin(2\pi f_c t)]$. The square wave s(t) can be represented by a series of sine waves whose frequencies are multiples of that of the square wave, realizing this and taking into account the effect of the low pass filters that reject the high frequency components, IB is proportional to $E[c(t) c(t+\tau)]\sin(\gamma)\cos(\phi)$, QB is proportional to $E[c(t) c(t+\tau)]\sin(\gamma)\sin(\phi)$, IQ is proportional to $E[c(t) c(t+\tau)]\cos(\gamma)\cos(\phi)$, QQ is proportional to $E[c(t) c(t+\tau)]\cos(\gamma)\cos(\phi)$, where $\phi$ is the carrier phase error, $\gamma$ is the phase difference between s(t) and fsP.

The envelope function Menv is proportional to the ideal envelope function, $E[c(t) c(t+\tau)]$. Because the envelope function is similar to the ideal envelope function, the envelope function can be used in place of M code correlators in a conventional tracking scheme to track the code phase of a BOC signal. A code tracker using an envelope detector is a course mode BOC signal code tracker. The course mode BOC code tracker can ensure that a traditional code tracking algorithm starts with a replica that is sufficiently close to the code phase of the incoming signal so as to ensure that the local maxima which it converges to corresponds to the point where the code phases are equal.

The envelope detection enables tracking any BOC signal, such as the M code signal. The M code envelope detector can be used in place of a code correlator in a code-tracking loop. The M code envelope detector can also be used in conjunction with an M code correlator to resolve the ambiguity in the tracking. The M code envelope detector could be used in place of an M code correlator in a coarse tracking mode, once the coarse tracking had converged to a sufficient accuracy where ambiguity was not an issue. A BOC correlator could be used along with the standard steepest-ascent tracking algorithm. Even when the standard BOC correlator is used in tracking, the M code envelope detector could be used to make sure the replica had not jumped off to another correlation peak.

Figure 3A:
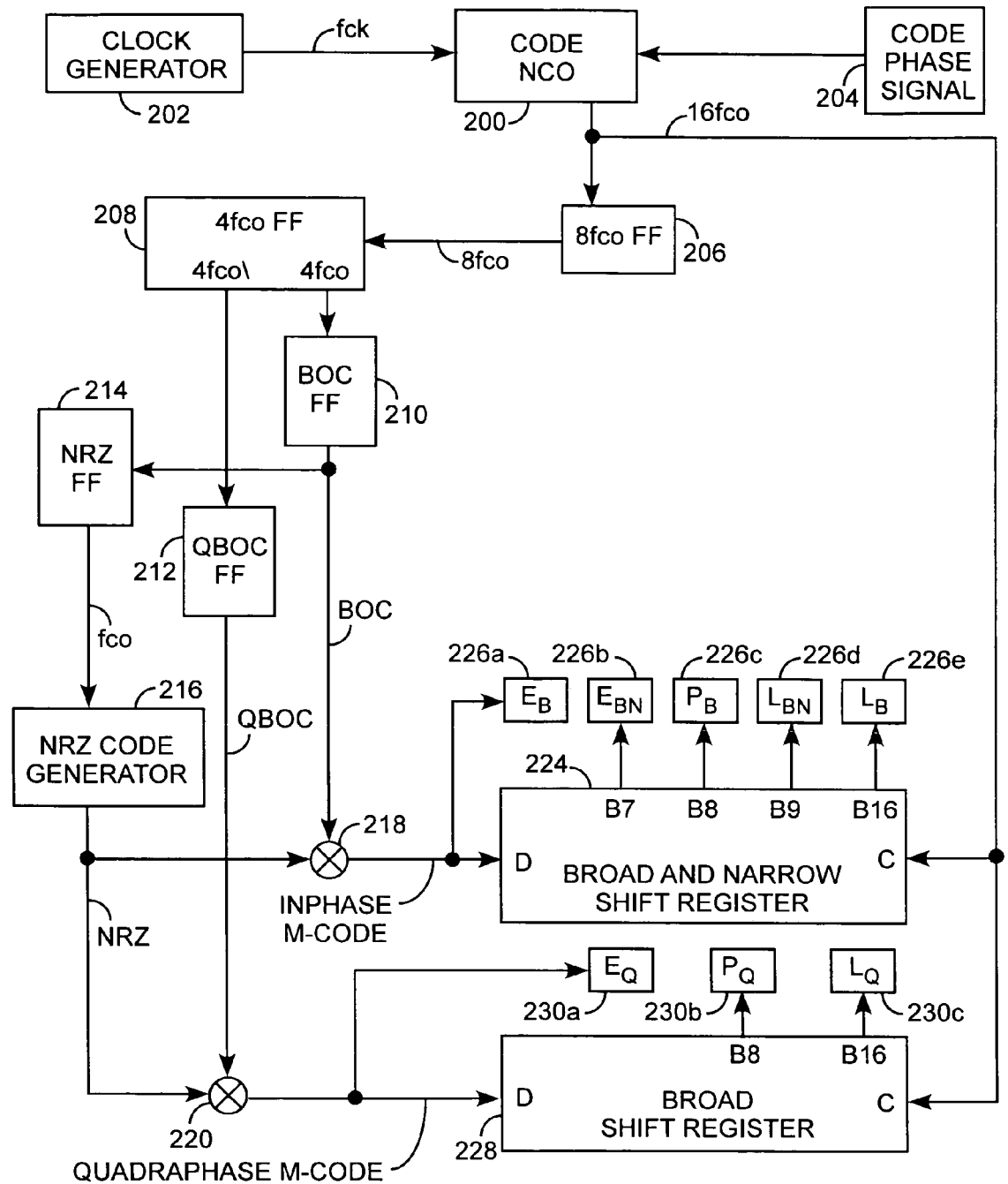
FIG. 3A is a block diagram of a broad and narrow M code replica generator.

Referring to FIG. 3A, a broad and narrow replica code generator is used for generating multiple replicas of a BOC spreading code, such as the M code. The replica generator receives a code phase rate signal 204 that is accumulated by the code NCO 200 at the clock frequency fck derived from a clock generator 202. Each time the code NCO 200 is clocked by fck the accumulator adds the digital value of the code phase signal 204 output to the previous code NCO 200 accumulator contents. Each time the code NCO 200 accumulator overflows it produces an epoch that clocks the broad and narrow shift register 224 and the broad shift register 228. In this M code design example the shift registers 224 and 225 clock rate is 16fco and 16fco is ultimately divided by 16 to produce fco from the NRZ flip-flop 214 as the code chipping rate input for the replica NRZ code generator 216. For M code this chipping rate is 5.115 Mcps plus code Doppler. The 16fco clocking signal is fed into an 8fco flip flop 206 for generating an 8fco clocking signal that is in turn fed to a 4fco flip flop 208 having complementary outputs for providing a 4fco clock signal and a 4fco\clock signal respectively fed into a BOC flip flop 210 and a QBOC flip flop 212. The BOC flip flop 210 and the QBOC flip flop 212 provide BOC, which is identical to 2fco and QBOC clock signals, respectively, fed to mixers 218 and 220. The 2fco signal is an inphase BOC square wave and the QBOC is a quadraphase BOC square wave, that is, phase shifted by 90 degrees with respect to the BOC square wave. The 2fco clock signal is further fed to NRZ flip flop 214 to complete the divide by 16 chain described earlier.

The NRZ code is fed into the mixers 218 and 220 that multiply the NRZ code with BOC which is equal to 2fco and with QBOC providing a replica inphase M code signal and a replica quadraphase M code signal, respectively. The replica inphase M code and replica quadraphase M code signals are respectively fed into data inputs of a broad and narrow shift register 224 and a broad shift register 228 that are clocked by the 16fco clock signal. The broad and narrow shift register 224 provides an $E_B$ early replica M code signal 226a at the data input being bit zero, provides an $E_{BN}$ early narrow replica M code signal 226b at bit seven, provides an $E_P$ prompt replica M code signal 226c at a center bit eight, provides an $L_{BN}$ late narrow replica M code signal 226d at bit nine, and provides an $L_B$ late replica M code signal 226e at bit sixteen, all of which being replicas of the M code signal, but phase shifted by delayed with respect to the input by one-sixteenth of an M code chip times the respective bit number. Concurrently, the broad shift register 228 provides an $E_Q$ early replica quadra M code signal 230a at the data input being bit zero, provides a $P_Q$ prompt replica quadra M code signal 230b at bit eight, and provides an $L_Q$ late replica quadra M code signal 230c at bit sixteen, all of which replicas being replicas of the quadra M code signal, but each delayed in time by the shift register delay of 1/16th M code chip times the respective bit number. The time differential between the early and late replicas $E_B$ and $L_B$, or the early and late replicas $E_Q$ and $L_Q$, at bits zero and sixteen, is a broad duration of one M code chip, whereas the time differential between the early and late narrow replicas $E_{BN}$ and $L_{BN}$, at bits seven and nine, is a narrow duration of 1/8 M code chip. As such, the broad shift register 228 defines a broad correlator spacing of one chip for the quadra M code replicas, and, the broad and narrow shift register 224 defines both the broad correlator spacing of one chip and a narrow correlator spacing of 1/8th chip for the M code replicas.

The phase shifted replica codes are provided by sixteen bit shift registers 224 and 228 so that register 224 shifts the replica M code (BOC×NRZ) and the other register 228 shifts the replica quadra M code (QBOC×NRZ). The (BOC×NRZ) signal is an inphase M code signal and the (QBOC×NRZ) replica code is a quadra-phase M code signal. The inphase M code signal and quadra-phase M code signal are applied to the data inputs of the shift registers 224 and 228, respectively. These shift registers 224 and 228 are clocked for code phase shifting at 16fco, which is applied to the clock inputs of the shift registers 224 and 228. In the exemplar form, 16fco is used, though any number could be used for various narrow time durations by multiplying two by the reciprocal of the desired narrowest E–L correlator spacing. The narrowest correlator spacing between E and L is one-eighth chip so the shift registers 224 and 228 are sixteen bits long. For the M code, the nearly optimal narrow correlator spacing is one-eighth chip. Broad correlators are typically separated by a one-chip duration.

The code NCO input is controlled by the output of the code discriminator plus code loop filter baseband functions. This code NCO input signal is depicted as a code phase increment per clock. The NCO input signal is typically a digital word that is updated at the beginning of each integrate and dump period representing the value that the NCO clock will add to itself each epoch such that the NCO will overflow on the average at the required code clock rate plus Doppler effect at the fco output signal. Because each overflow at NCO output represents the advancement of the NRZ code generator by one chip, at any point in time the contents of the NCO represents the precise fractional part of the replica code state. This fraction along with the integer phase shift of the replica code generator is used to determine the transmit time of the GPS satellite signal. In order to generate the quadrature signal of QBOC, the required signal is 8fco or eight times the required replica NRZ-code generator chipping rate. For M code, the chipping rate is 5.115 Mcps plus the required code Doppler frequency referenced to 5.115 MHz. The flip-flop with the 4fco output divides the 8fco signal by two producing two complementary 4fco phases that are exactly 180 degrees out of phase with respect to each other. One of these two complementary outputs is divided by two by the flip-flop producing 2fco, which is identical to the M code BOC square wave signal. The second complementary output is divided by two by the flip-flop producing the QBOC output modulating signal. As a result, QBOC is always exactly ninety degrees out of latent phase with respect to BOC regardless of the code Doppler value. Thus, the QBOC clock signal is in perfect phase quadrature with respect to the BOC clock signal.

Referring to FIGS. 3A and 3B, and more particularly to FIG. 3B, the M code and quadra M code time-staggered replicas $E_B$ 226a, $E_{BN}$ 226b, $P_B$ 226c, $L_{BN}$ 226d, $L_B$ 226e, $E_Q$ 230a, $P_Q$ 230b, and $L_Q$ 230c can be used for code phase error tracking by generating the code phase error signal 204 in a broad and narrow M code phase generator. A carrier tracking loop 240 provides a carrier phase signal to a carrier NCO 242 for generating sine and cosine carrier replicas. A received digital IF signal 250 is fed into a carrier wipe-off demodulator 252 receiving the sine and cosine carrier replicas for demodulating an IF carrier for generating inphase (I) and quadraphase (Q) baseband signals. Baseband processing occurs downstream of the carrier and code wipe-off and integrate and dump functions, and is usually performed in a receiver or navigation processor. Baseband processing includes the carrier and code loop discriminator function plus loop filtering. The carrier discriminator operates on the I and Q baseband signals with the two quadrant arc-tangent discriminator for signals with data modulation. The code discriminator typically operates on the E and L baseband signals, but can also use the P baseband signals. For example, the dot product power code loop discriminator uses all the replica codes, the early, prompt and late I and Q replicas. Therefore, the P replica codes are also provided to the code discriminator 254 along with the E and L replica codes in case the dot product code discriminator is used.

The broad and narrow M code phase generator includes a code loop discriminator 254 for providing a code discriminator error signal that is filtered by a loop filter 256 for providing the code phase signal 204 and fed back to the code NCO input 200. The I and Q baseband signals output from the carrier wipe-off demodulator 252 are correlated with the code replica signals $E_B$ 226a, $E_{BN}$ 226b, $P_B$ 226c, $L_{BN}$ 226d, $L_B$ 226e, $E_Q$ 230a, $P_Q$ 230b, and $L_Q$ 230c using a plurality of correlators 260a through 260q feeding a respective plurality of integrate and dump (I/D) accumulators 270a through 270q for providing integrated I and Q signals fed into the code loop discriminator 254. Specifically, the $E_B$ replica 226a is correlated with the I baseband signal by correlator 260a and integrated by I/D accumulator 270e for providing an integrated $I_{EB}$ signal, the $E_B$ replica 226a is correlated with the Q baseband signal by correlator 260c and integrated by I/D accumulator 270g for providing an integrated $Q_{EB}$ signal, the $E_Q$ replica 230a is correlated with the I baseband signal by correlator 260b and integrated by I/D accumulator 270f for providing an integrated $I_{EQ}$ signal, the $E_Q$ replica 230a is correlated with the Q baseband signal by correlator 260d and integrated by I/D accumulator 270h for providing an integrated $Q_{EQ}$ signal, the $L_B$ replica 226e is correlated with the I baseband signal by correlator 260e and integrated by I/D accumulator 270i for providing an integrated $I_{LB}$ signal, the $L_B$ replica 226e is correlated with the Q baseband signal by correlator 260g and integrated by I/D accumulator 270k for providing an integrated $Q_{LB}$ signal, the $L_Q$ replica 230c is correlated with the I baseband signal by correlator 260f and integrated by I/D accumulator 270j for providing an integrated $I_{LQ}$ signal, the $L_Q$ replica 230c is correlated with the Q baseband signal by correlator 260h and integrated by I/D accumulator 270m for providing an integrated $Q_{LQ}$ signal, the $E_{BN}$ replica 226b is correlated with the I baseband signal by correlator 260i and integrated by I/D accumulator 270n for providing an integrated $I_{EBN}$ signal, the $E_{BN}$ replica 226b is correlated with the Q baseband signal by correlator 260k and integrated by I/D accumulator 270p for providing an integrated $Q_{EBN}$ signal, the $L_{BN}$ replica 226d is correlated with the I baseband signal by correlator 260j and integrated by I/D accumulator 270p for providing an integrated $I_{LBN}$ signal, the $L_{BN}$ replica 226d is correlated with the Q baseband signal by correlator 260m and integrated by I/D accumulator 270q for providing an integrated $Q_{LBN}$ signal, the $P_B$ replica 226c is correlated with the I baseband signal by correlator 260n and integrated by integrating dumper 270a for providing an integrated $I_{PB}$ signal, the $P_B$ replica 226c is correlated with the Q baseband signal by correlator 260o and integrated by I/D accumulator 270b for providing an integrated $Q_{PB}$ signal, the $P_Q$ replica 230b is correlated with the I baseband signal by correlator 260p and integrated by I/D accumulator 270c for providing an integrated $I_{PQ}$ signal, and the $P_Q$ replica 230b is correlated with the Q baseband signal by correlator 260q and integrated by I/D accumulator 270d for providing an integrated $Q_{PQ}$ signal. The integrated $I_{EB}$, $I_{EQ}$, $Q_{EB}$, $Q_{EQ}$, $I_{LB}$, $I_{LQ}$, $Q_{LB}$, $Q_{LQ}$, $I_{EBN}$, $I_{LBN}$, $Q_{EBN}$, $Q_{LBN}$, $Q_{PQ}$, $I_{PQ}$, $I_{PB}$, and $Q_{PB}$ signals are fed into the code loop discriminator 254 that first detects the BOC signal envelopes by generating operating points on the unimodal correlation envelope at respective broad early, narrow early, prompt, narrow late, and broad late phase error times and provides the code discriminator error signal so that the code phase signal will adjust the code phase at the peak operating point of the prompt error time on the unimodal correlation envelope. Operating point differentials between early and late, and narrow early and narrow late code phases indicate the up or down direction of adjustment to the code phase error signal 204. The discriminator 254 can use various combinations of the integrated signals for determining the adjustments to the code phase error signal 204. The integrated I and Q baseband signals can be further used to adjust the carrier phase signal provided by the carrier tracking loop 240. Particularly, the $Q_{PQ}$, $I_{PQ}$, $I_{PB}$, and $Q_{PB}$ signals are fed into carrier tracking loop 240 for adjusting the carrier replica from the sine generator 246 and cosine generator 248 for precise coherent carrier demodulation wipe-off by the carrier wipe-off demodulator 252.

The integrate and dump integration period is usually matched to the predetection integration time period of the navigation data message modulation. The integrate and dump process reduces the digital process sample rate from the IF analog-to-digital sample rate of the order of 50.0 MHz for M code, to the navigation symbol rate of the order of 100.0 Hz for M code, which significantly reduces the baseband processing rate. Part of the M code is dataless, every other code chip, so the integrate and dump process can be extended when only the dataless code epochs are processed.

Figure 4A:
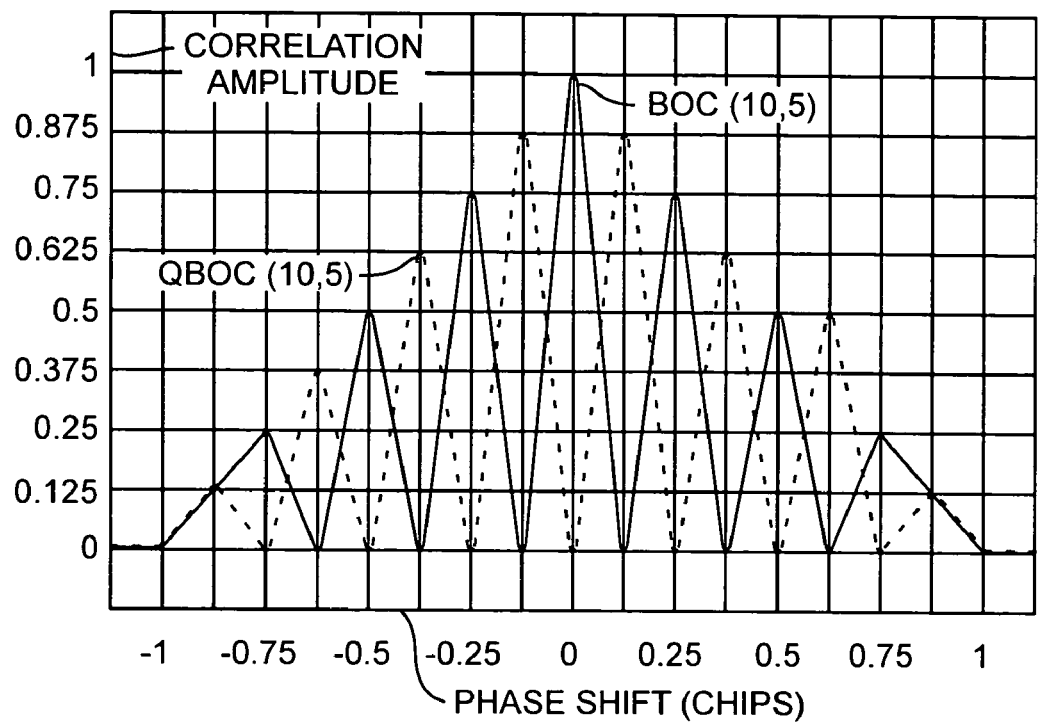
FIG. 4A is a graph of Quadra BOC(10,5) and BOC(10,5) correlation envelopes.

Referring to FIG. 4A, the correlation envelopes of the inphase M code, the BOC(10,5) code, is characterized as multimodal having a plurality of peaks across a broad chip phase of one chip duration on each side of the zero phase point with a maximum center peak and three peaks of decreasing amplitude extending on each side from the center peak, as is well known, using a sum of the squares function. The correlation envelopes of the quadra-phase M code, the QBOC(10, 5) code, is characterized also as multimodal having a plurality of peaks across a broad chip phase of one chip duration on each side of the zero phase point with a null at center zero phase point and with four peaks of decreasing amplitude extending on each side from the center null.

Figure 4B:
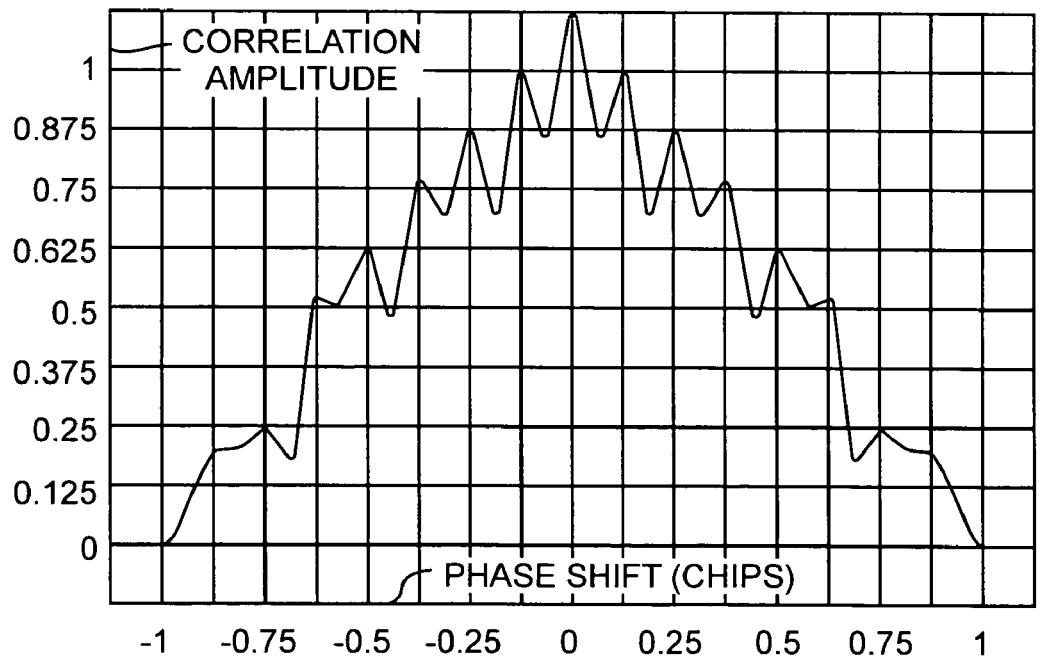
FIG. 4B is a graph of a combined Quadra BOC(10,5) plus BOC(10,5) correlation envelope.

Referring to FIGS. 4A and 4B, and more particularly to FIG. 4B, when the inphase (BOC) and quadra-phase (QBOC) correlation envelopes are appropriately combined they form a near unimodal correlation envelope that is characterized as having a single center peak with a decreasing amplitude extending from the center zero phase position. The combined correlation envelope is characterized and near unimodal by virtue of having a center peak with ripples appearing in the envelope.

Figure 5A:
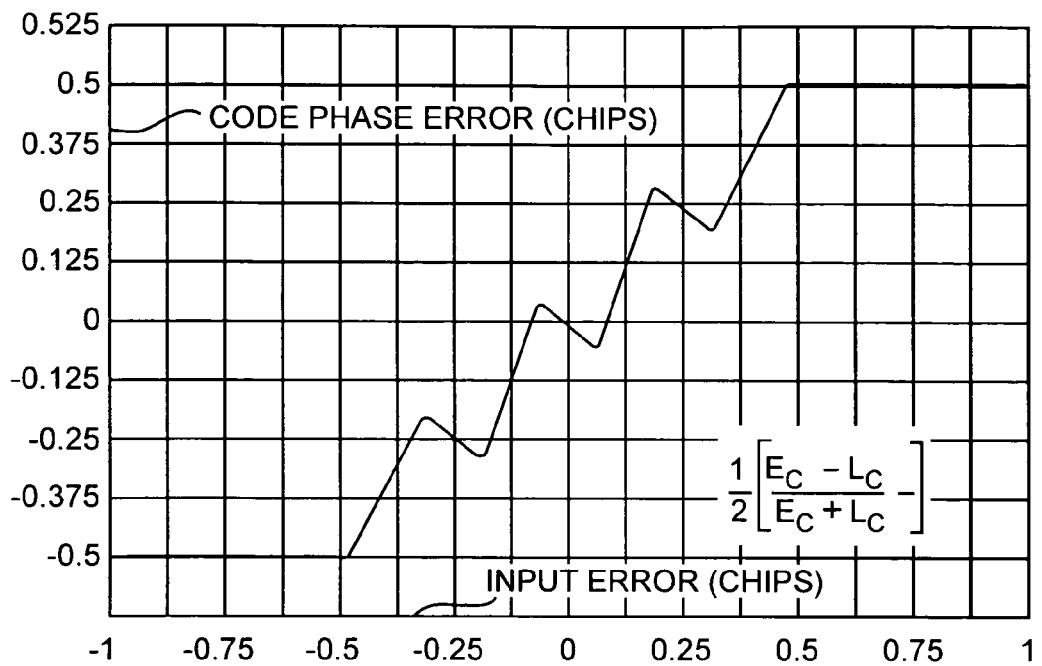
FIG. 5A is a graph of a normalized combined broad BOC (10,5) code phase error.

Referring to FIGS. 4A, 4B, and 5A, and more particularly to FIG. 5A, the code phase error is depicted as a function of the input error that changes as a function of the code phase between the incoming code and the prompt replica code. The input error is a function of an early correlation amplitude and a late correlation amplitude of the combined correlation envelope where the time differential between the early replica and late replica is a broad one-chip duration. That is, the code phase error is computed equal to $(\frac{1}{2})(Ec-Lc)/(Ec+Lc)$, where Ec is the combined early code envelope and Lc is the combined late code envelope with an effective correlator separation of one chip. To compute Ec and Lc, the broad integrated $I_{EB}$, $I_{EQ}$, $Q_{EB}$, $Q_{EQ}$, $I_{LB}$, $I_{LQ}$, $Q_{LB}$, and $Q_{LQ}$ signals are processed as $Ec=\sqrt{[I_E^2+Q_E^2]}$, where $I_E=\sqrt{[I_{EB}^2+I_{EQ}^2]}$ and $Q_E=\sqrt{[Q_{EB}^2+Q_{EQ}^2]}$, and as $Lc=\sqrt{[I_L^2+Q_L^2]}$, where $I_L=\sqrt{[I_{LB}^2+I_{LQ}^2]}$ and $I_L=\sqrt{[Q_{LB}^2+Q_{LQ}^2]}$, with these early and late replica are separated by a one chip duration. That is, the normalized broad unambiguous BOC(10,5) code loop discriminator output is based on the squares of the integrated $I_{EB}$, $I_{EQ}$, $Q_{EB}$, $Q_{EQ}$, $I_{LB}$, $I_{LQ}$, $Q_{LB}$, and $Q_{LQ}$ signals. Although the envelope computation is optimal, the power terms $E^2$ and $L^2$ can also be used in the code discriminator algorithm to reduce the processing load by eliminating the square root computation. The code discriminator computes the code phase error by detecting the correlation envelope from the integrated $I_{EB}$, $I_{EQ}$, $Q_{EB}$, $Q_{EQ}$, $I_{LB}$, $I_{LQ}$, $Q_{LB}$, and $Q_{LQ}$ signals using sum of squares computations. However, while the code phase error is unambiguous and conveniently computed from only the $I_{EB}$, $I_{EQ}$, $Q_{EB}$, $Q_{EQ}$, $I_{LB}$, $I_{LQ}$, $Q_{LB}$, and $Q_{LQ}$ signals there exist three small, but undesirable, error reversals occurring in a quarter-chip duration at the zero input error point and at the plus and minus one-quarter chip input error points.

Referring to FIGS. 4A, 4B, 5A, and 5B to minimize the error reversals in a quarter-chip duration pull-in region surrounding the zero input error axis, the code loop discriminator can use the narrow integrated signals $I_{EBN}$, $I_{LBN}$, $Q_{EBN}$, and $Q_{LBN}$ in connection with the BOC(10,5) correlation envelope shown FIG. 4A to implement an ambiguous normalized narrow code loop discriminator whose output is added to the output of the normalized combined broad discriminator output shown in FIG. 5A.

The normalized ambiguous BOC(10,5) code loop discriminator function would have a nearly optimal narrow correlator one-eighth chip spacing duration. Only the narrow correlator BOC early and late signals $E_{BN}$ and $L_{BN}$ are used. These $E_{BN}$ and $L_{BN}$ signals are used in the conventional code wipe-off demodulator to generate the narrow integrated signals $I_{EBN}$, $I_{LBN}$, $Q_{EBN}$, and $Q_{LBN}$. The normalized ambiguous narrow code phase error is computed equal to $(\frac{1}{16})(En-Ln)/(En+Ln)$, where the early narrow envelope $En=\sqrt{[I_{EN}^2+Q_{EN}^2]}$ with $I_{EN}=\sqrt{[I_{EBN}^2+I_{EQN}^2]}$ and $Q_{EN}=\sqrt{[Q_{EBN}^2+Q_{EQN}^2]}$, and the late narrow envelope $Ln=\sqrt{[I_{LN}^2+Q_{LN}^2]}$ with $I_{LN}=\sqrt{[I_{LBN}^2+I_{LQN}^2]}$ and $Q_{LN}=\sqrt{[Q_{LBN}^2+Q_{LQN}^2]}$. The normalized ambiguous narrow code phase error is added to the unambiguous combined broad code phase error to produce the nearly linear unambiguous code phase error shown in FIG. 5B.

Figure 5B:
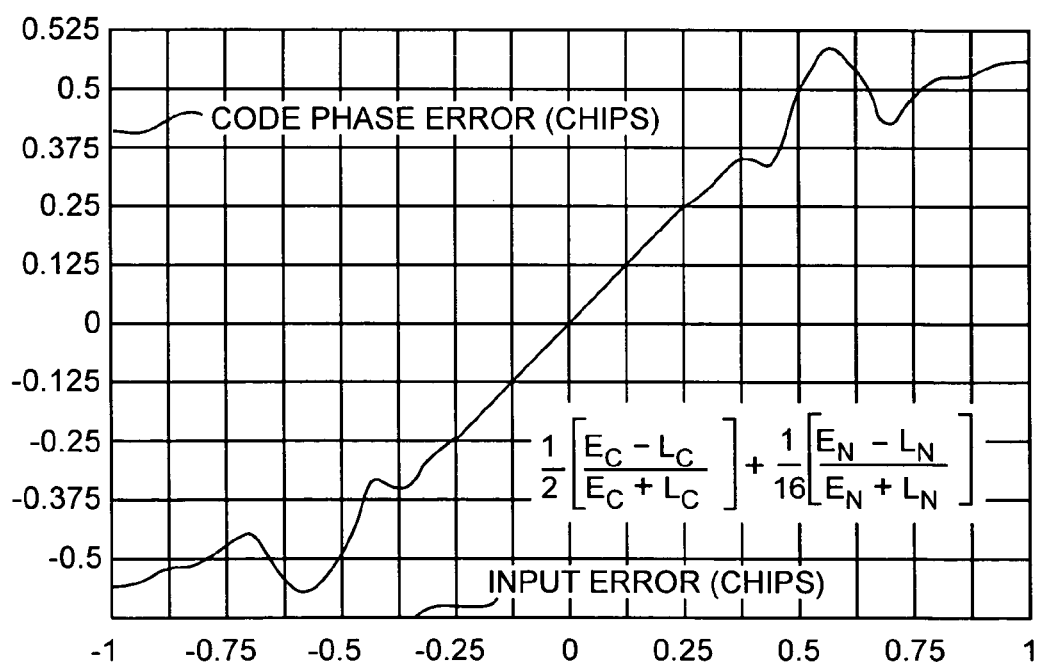
FIG. 5B is a graph of a normalized combined broad and uncombined narrow code phase error.

As observed in FIG. 5B when the ambiguous and unambiguous code loop discrimination functions are added together, most of the ripple of FIG. 5A has been removed and the resulting discriminator output has a near linear function about the zero axis point so that the resulting loop discriminator output is nearly a true representation of the input error. The code phase error output has been normalized by dividing the E–L discriminator with the E+L signals to remove amplitude sensitivity of the code loop discriminator, which is important when operating in varying signal amplitude environments such as jamming. This code loop discriminator function can be used to solve the ambiguity problem for any BOC spread spectrum communications or navigation application, such as the M code BOC(10,5) signal.

The invention is directed to providing an unambiguous code phase error function base upon generating a quadra-phase BOC signal from a conventional inphase BOC signal, which may be an M code signal, and can be applied to both digital and analog front-end receivers. For example, the invention could be applied to a generic GPS N-channel digital receiver, where N is the number of digital channels implemented in a GPS receiver. The carrier frequency may be, for example the L1 frequency. For multiple frequency receivers, a separate down converter stage per frequency is required. The digital signal containing the digitized signals in space plus noise can be fed to all N digital channels. Each channel tracks one of the GPS signals in space by replicating the carrier signal plus any Doppler effects and a unique PRN code plus any Doppler effects. Using the replica carriers and PRN codes, these signals in space are despread and tracked, thereby producing the transmitted code phase and carrier phase observables and demodulating the navigation data message. The receiver or navigation processor controls the N digital receiver channels search and tracking processes, incorporates the observables and utilizes the navigation message data to locate all N satellites, to correct the measurements as required to navigate the phase center of the receiving antenna.

The addition of quadra-phase BOC replica signal for use in a code loop discriminator provides continuous ambiguity resolution in communications or navigation receivers operating with transmitted binary offset carrier modulated spread spectrum signals. The code loop discriminator can provide a normalized code phase error signal. The QBOC is used to solve the BOC code tracking ambiguity problem by the generation of a QBOC code replica. The combination of QBOC replica code with the replica BOC code produces a unimodal correlation characteristic with only one correlation peak occurring for all phase shifts within one chip period of the PRN chipping code sequence generator, thereby continuously removing all ambiguity in the code discriminator output signal for any spread spectrum receiver designed to operate with an incoming BOC signal.

The invention is applicable to combinations of code correlator spacing and all forms of unambiguous code discriminators. In particular, the correlator spacing and code discriminator combination optimizes the output error to the input error. The unambiguous code discriminator output uses a one-chip early minus late (E−L) correlator spacing and a normalized (½)(E−L)/(E+L) code discriminator. The synthesis of inphase I and quadra-phase Q components resulting from code wipe-off with respect to the incoming BOC signals using the replica codes. In particular, the synthesis of QBOC I and Q signals. Various combinations of code correlator spacings for various forms of an ambiguous code discriminator having an output that can be added to the output of an unambiguous code discriminator. In particular, the ambiguous narrow correlator spacing that, when added to the unambiguous code correlator results in an unambiguous output error that best optimizes the output error to best equal the input error, such as the sum of the ambiguous code discriminator output and the unambiguous code discriminator. The loop discriminator function could be further enhanced for computation efficiency while using other integrated quadrature signals. Those skilled in the art can make enhancements, improvements, and modifications to the invention, and these enhancements, improvements, and modifications may nonetheless fall within the spirit and scope of the following claims.

What is claimed is:

1. A system for detecting a broad correlation envelope and a narrow correlation envelope of a received signal comprising a carrier modulated by a spreading code, the system comprising, a splitting means for splitting the received signal into an inphase signal and a quadraphase signal, the splitter means further for coherently demodulating the received signal by mixing the received signal by a carrier replica, the splitter means further for coherently despreading the received signal by mixing the received signal by code replicas of despreading codes, the despreading codes and code replicas defining a code phase error between the received spreading codes and code replicas, the splitting means serving to demodulate in quadrature and despread and split the inphase signal and the quadraphase signal into I and Q inphase signals and I and Q quadraphase signals for each of the code replicas, a correlation means for generating narrow and broad correlation values from broad and narrow code replicas of the code replicas and from the I and Q inphase signals and I and Q quadraphase signals, the narrow correlation values generated from the I and Q inphase signals, the broad correlations values generated from the I and Q inphase signals and I and Q quadraphase signals, the narrow correlation values defining a narrow correlation envelope, the broad correlation values defining a broad correlation envelope, a replica code generator means for receiving the code phase error and for generating and shifting the code replicas in time for generating and aligning a prompt code replica of the code replicas with the received spreading code for coherently despreading the received signal in synchronism between the prompt code replica and the spreading code, the replica code generator generating the narrow code replicas and the broad code replicas of the code replicas, a discriminator means for generating the code phase error from the narrow correlation envelope and the broad correlation envelope, the discriminator means for adjusting the code phase error over differing narrow and broad correlation values, and wherein, the narrow code replicas comprise a narrow early code replica and a narrow late code replica, the narrow early code replica and the narrow late code replica are separated in time by a narrow time duration, the broad code replicas comprise a broad early code replica and a broad late code replica, the broad early code replica and the broad late code replica are separated in time by a broad time duration, the broad duration time is greater than the narrow duration time, and the narrow correlation values linearly changing over differing values of the code phase error when the code phase error is less than the narrow time duration.

2. The system of claim 1 wherein, the broad correlation envelope is a unimodal correlation envelope over the broad duration time, the narrow correlation envelope is also a unimodal correlation envelope over the narrow duration time, and the narrow correlation envelope is a multimodal correlation envelope over the board duration time.

3. The system of claim 1 wherein, the broad correlation envelope is a unimodal correlation envelope over the broad duration time, the narrow correlation envelope is also a unimodal correlation envelope over the narrow duration time, the narrow correlation envelope is a multimodal correlation envelope over the board duration time, and the broad and narrow correlation envelopes provide for an unambiguous code phase error detection when the code phase error is less that the narrow time duration.

4. The system of claim 1 wherein, the spreading code is an M code, the M code is a mix of a PRN code and a binary offset carrier squarewave, and the narrow and broad correlation values are generated from the sum of the squares of the I and Q inphase signals and the I and Q quadraphase signals.

5. The system of claim 1 wherein, the despreading codes comprise a mix of a PRN code and a binary offset carrier squarewave for despreading the received signal into the I and Q inphase signals, and the despreading codes comprise a mix of the PRN code and the binary offset carrier squarewave phase shifted ninety degrees respecting the PRN code for despreading the received signal into the I and Q quadraphase signals.

6. The system claim 1, wherein, the code phase error is a scaled filtered sum of a narrow code phase error and a broad code phase error, the discriminator means detecting the narrow code phase error from the narrow correlation envelope and the narrow code replicas, and the discriminator means detecting the broad code phase error from the broad correlation envelope and the broad code replicas.

7. The system of claim 1, wherein, the discriminator means detects a narrow code phase error from the narrow correlation envelope and the narrow code replicas, the discriminator means detects a broad code phase error from the broad correlation envelope and the broad code replicas, the code phase error is firstly a scaled filtered broad code phase error of the broad code phase error detected from the broad correlation envelope within the broad time duration, the code phase error is then secondly a scaled filtered sum of the narrow code phase error and the broad code phase error.

8. The system of claim 1, wherein, the discriminator means detects a narrow code phase error from the narrow correlation envelope and the narrow code replicas, the discriminator means detects a broad code phase error from the broad correlation envelope and the broad code replicas, the code phase error is firstly a scaled filtered broad code phase error of the broad code phase error detected from the broad correlation envelope within the broad time duration, and the code phase error is then secondly a scaled filtered narrow code phase error of the narrow code phase error from the narrow correlation envelope.

9. The system of claim 1, wherein, the discriminator means detects a narrow code phase error from the narrow correlation envelope and the narrow code replicas, the discriminator means detects a broad code phase error from the broad correlation envelope and the broad code replicas, the code phase error is firstly a first code phase error selected from the group consisting of a scaled filtered broad code phase error of the broad code phase error detected from the broad correlation envelope within the broad time duration and of a scaled filtered sum of the narrow code phase error and the broad code phase error detected from the broad and narrow correlation envelopes, the code phase error is secondly a second code phase error being a scaled filtered narrow code phase error of the narrow code phase error from the narrow correlation envelope, wherein, when the code phase error is greater than the narrow time duration then the code phase error becomes the first code phase error, and when the code phase error is less than the narrow time duration, the code phase error becomes the second code phase error.

10. The system of claim 1, wherein, when the code phase error is not synchronized to the spreading code within the broad time duration, then the broad correlation envelope is exclusively used to determine a broad code phase error as the code phase error within the broad time duration.

11. A system for detecting a broad correlation envelope and a narrow correlation envelope of a received signal comprising a carrier modulated by a spreading code, the received signal is a binary offset carrier (BOC) signal, the system comprising, a splitting means for splitting the received signal into an inphase BOC signal and a quadraphase BOC signal, the splitter means further for coherently demodulating the received signal by mixing the received signal by a carrier replica, the splitter means further for coherently despreading the received signal by mixing the received signal by code replicas of despreading codes, the despreading codes and code replicas defining a code phase error between the spreading code and code replicas, the splitting means serving to demodulate in quadrature and despread and split the inphase BOC signal and the quadraphase BOC signal into sets of I and Q inphase BOC signals and I and Q quadraphase BOC signals for each of the code replicas, a correlation means for generating narrow and broad correlation values from broad and narrow code replicas of the code replicas and from the I and Q inphase BOC signals and I and Q quadraphase BOC signals, the narrow correlation values generated from the I and Q inphase BOC signals, the broad correlations values generated from the I and Q inphase BOC signals and I and Q quadraphase BOC signals, the narrow correlation values defining the narrow correlation envelope, the broad correlation values defining the broad correlation envelope, a replica code generator means for receiving the code phase error and for generating and shifting the code replicas in time for generating and aligning a prompt code replica of the code replicas with the received spreading code for coherently despreading the received signal in synchronism between the prompt code replica and the spreading code, the replica code generator generating the narrow code replicas and the broad code replicas of the code replicas, a discriminator means for generating the code phase error from the narrow correlation envelope and the broad correlation envelope, the discriminator means for adjusting the code phase error over differing narrow and broad correlation values, and wherein,
the narrow code replicas comprise a narrow early code replica and a narrow late code replica,
the narrow early code replica and the narrow late code replica are separated in time by a narrow time duration,
the narrow correlation values linearly changing over differing values of the code phase error when the code phase error is less than twice the narrow time duration,
the broad code replicas comprise a broad early code replica and a broad late code replica,
the broad early code replica and the broad late code replica are separated in time by a broad time duration,
the broad duration time is greater than the narrow duration time,
the broad correlation envelope is a unimodal correlation envelope over the broad duration time,
the narrow correlation envelope is also a unimodal correlation envelope over the narrow duration time, and
the broad and narrow correlation envelopes provide for an unambiguous code phase error detection when the code phase error is less than the narrow time duration.

12. The detector of claim 11 wherein,
the despreading codes comprise a mix of a PRN code and a binary Offset carrier squarewave for despreading the received signal into I and Q, and
the despreading codes comprise a mix of the PRN code and the binary offset carrier squarewave phase shifted ninety degrees for despreading the received signal into the I and Q quadraphase BOC signals, and
the spreading code is a mix of the PRN code and the binary offset carrier squarewave for spreading of the received signal.

13. The system of claim 11 wherein,
the narrow correlation values comprising a sum of squares of the I and Q inphase BOC signals, and
the broad correlation values comprising a sum of squares of the I and Q inphase BOC signals and I and Q quadraphase BOC signals.

14. The system of claim 11 wherein,
the discriminator means is a code loop discriminator.

15. A system for detecting a broad correlation envelope and a narrow correlation envelope of a received signal comprising a carrier modulated by a spreading code, the received signal is a binary offset carrier (BOC) signal, the system comprising,
a splitting means for splitting the received signal into an inphase BOC signal and a quadraphase BOC signal, the splitter means further for coherently demodulating the received signal by mixing the received signal by a carrier replica, the splitter means further for coherently despreading the received signal by mixing the received signal by code replicas of despreading codes, the despreading codes and code replicas defining a code phase error between the spreading code and code replicas, the splitting means serving to demodulate in quadrature and despread and split the inphase BOC signal and the quadraphase BOC signal into I and Q inphase BOC signals and I and Q quadraphase BOC signals for each of the code replicas,
a correlation means for generating narrow and broad correlation values from narrow and broad code replicas of the code replicas and from the I and Q inphase BOC signals and I and Q quadraphase BOC signals, the narrow correlation values generated from the I and Q inphase BOC signals, the broad correlations values generated from the I and Q inphase BOC signals and I and Q quadraphase BOC signals, the narrow correlation values defining the narrow correlation envelope, the broad correlation values defining the broad correlation envelope, the narrow correlation values comprising a sum of squares of the I and Q inphase BOC signals, the broad correlation values comprising a sum of squares of the I and Q inphase BOC signals and I and Q quadraphase BOC signals,
a replica code generator means for receiving the code phase error and for generating and shifting the code replicas in time for generating and aligning a prompt code replica of the code replicas with the received spreading code for coherently despreading the received signal in synchronism between the prompt code replica and the spreading code, the replica code generator generating the narrow code replicas and the broad code replicas of the code replicas, and
a discriminator means for generating the code phase error from the narrow correlation envelope and the broad correlation envelope, the discriminator means for adjusting the code phase error over differing narrow and broad correlation values, and
wherein,
the narrow code replicas comprise a narrow early code replica and a narrow late code replica,
the narrow early code replica and the narrow late code replica are separated in time by a narrow time duration,
the narrow correlation values linearly changing over differing values of the code phase error when the code phase error is less than the narrow time duration,
the broad code replicas comprise a broad early code replica and a broad late code replica,
the broad early code replica and the broad late code replica are separated in time by a broad time duration,
the broad duration time is greater than the narrow duration time
the broad correlation envelope is a unimodal correlation envelope over the broad duration time,
the narrow correlation envelope is also a unimodal correlation envelope over the narrow duration time, and
the broad and narrow correlation envelopes provide for an unambiguous code phase error when the code phase error is less than the narrow time duration.

16. The detector of claim 15 wherein,
the despreading codes comprise a mix of a PRN code and a binary offset carrier squarewave for despreading the received signal into I and Q,
the despreading codes comprise a mix of the PRN code and the binary offset carrier squarewave phase shifted ninety degrees for despreading the received signal into the I and Q quadraphase BOC signals, and
the spreading code is a mix of the PRN code and the binary offset carrier squarewave for spreading of the received signal.

17. The detector of claim 15 wherein,
the I inphase BOC signal is $I_B$,
the Q inphase BOC signal is $Q_B$,
the I quadraphase BOC signal is $I_Q$,
the Q quadraphase BOC signal is $Q_Q$, and
the broad correlation values are combined correlation values being equal to $\sqrt{[I_B^2+Q_B^2+I_Q^2+Q_Q^2]}$.

18. The detector of claim 15 wherein,
the I inphase BOC signal is $I_B$,
the Q inphase BOC signal is $Q_B$, and
the narrow correlation values are uncombined correlations values being equal to $\sqrt{[I_B^2+Q_B^2]}$.

19. The detector of claim 15 wherein,
the I inphase BOC signal is $I_B$,
the Q inphase BOC signal is $Q_B$, the I quadraphase BOC signal is $I_Q$, the Q quadraphase BOC signal is $Q_Q$, and the broad correlation values are combined correlation values equal to $\sqrt{[I_B^2+Q_B^2+I_Q^2+Q_Q^2]}$, the broad correlation values for a broad late IBOC code replica and a broad late QBOC code replica is LC, the broad correlation values for a broad early IBOC code replica and a broad early QBOC code replica is EC, the narrow correlation values are uncombined correlation values equal to $\sqrt{[I_B^2+Q_B^2]}$, the narrow correlation values for a narrow late IBOC code replica is LN, the narrow correlation values for a narrow early IBOC code replica is EN, and the code phase error is equal to (EC−LC/EC+LC)/2+(EN−LN/EN+LN)/16.

* * * * *